(12) United States Patent
Scaglotti et al.

(10) Patent No.: US 6,361,301 B1
(45) Date of Patent: Mar. 26, 2002

(54) HEATER ASSEMBLY FOR BLOW MOLDING PLASTIC PREFORMS

(75) Inventors: Ronald L. Scaglotti, Woodstock, GA (US); Paul H. Moats, Valley City; Andrew D. West, Medina, both of OH (US)

(73) Assignee: Plastipak Packaging, Inc., Plymouth, MI (US)

(*) Notice: Subject to any disclaimer, the term of this patent is extended or adjusted under 35 U.S.C. 154(b) by 0 days.

(21) Appl. No.: 09/507,609

(22) Filed: Feb. 21, 2000

(51) Int. Cl.$^7$ .............................................. B29C 49/68
(52) U.S. Cl. .................. 425/174.4; 264/454; 264/458; 264/535; 425/526; 432/121; 432/230
(58) Field of Search ........................ 425/174.4, 526; 264/454, 458, 535; 432/121, 230

(56) References Cited

U.S. PATENT DOCUMENTS

| | | | |
|---|---|---|---|
| 4,923,395 A | * | 5/1990 | Coxhead et al. ............ 425/526 |
| 5,180,893 A | * | 1/1993 | Sugiyama et al. .......... 264/458 |
| 5,256,341 A | | 10/1993 | Denis et al. |
| 5,549,468 A | * | 8/1996 | Michell et al. ............. 264/535 |
| 5,681,521 A | | 10/1997 | Emmer et al. |
| 5,920,677 A | * | 7/1999 | Emmer et al. .............. 425/526 |

FOREIGN PATENT DOCUMENTS

| | | | | |
|---|---|---|---|---|
| DE | 3826841 A1 | * | 2/1990 | ................ 425/526 |
| GB | 2095611 A | * | 10/1982 | ................ 264/458 |
| JP | 63-307928 A | * | 12/1988 | |

* cited by examiner

*Primary Examiner*—Robert Davis
(74) *Attorney, Agent, or Firm*—Brooks & Kushman P.C.

(57) ABSTRACT

A heater assembly (20) for heating blow molding plastic preforms (14) includes a plurality of elongated heaters (26) mounted by a housing (24) and extending along a path of conveyance of the preforms in a parallel relationship to each other, and each heater includes an elongated parabolic reflector (44) that reflects radiation from an adjacent elongated bulb (36) to irradiate the conveyed preforms. The heater assembly (20) also includes a quartz window (58) located between the elongated heaters (26) and the conveyed preforms (14) to transmit infrared radiation while blocking longer wavelength radiation so as to provide uniform heating of the conveyed preforms.

7 Claims, 5 Drawing Sheets

HEATER ASSEMBLY FOR BLOW MOLDING PLASTIC PREFORMS

TECHNICAL FIELD

This invention relates to a heater assembly for heating blow molding plastic preforms in preparation for blow molding thereof as containers.

BACKGROUND ART

Injection molded preforms in one type of processing are cooled after the injection molding and subsequently heated in preparation for blow molding as containers. Such preforms conventionally have an elongated shape with a closed end and an open end that is injection molded to the dispensing end configuration of the container, normally with a threaded construction for securing a closure cap utilized to seal and selectively allow opening of the container for dispensing of its contents.

Conventional ovens for heating blow molding plastic preforms include a plurality of heater assemblies spaced along a conveyor on which the preforms are conveyed adjacent the heater assemblies, usually with the preforms in an upside down orientation with their open ends positioned downwardly and their closed ends projecting upwardly, and with the preforms being rotated about associated horizontal axes so as to provide uniformity of the heating provided by the heater assemblies. Each heater assembly conventionally includes a plurality of elongated heaters that each have an elongated bulb for heating the conveyed preforms. Usually such bulbs have a white oxide coating on the side thereof that faces away from the preform so that radiation is reflected from that coating back toward the preform in an attempt to provide efficiency in the heating. However, such coatings cause substantial heating of the bulbs and are not efficient in reflecting infrared light which is more effective in uniformly heating the preforms than longer wave light. More specifically, the infrared light penetrates the outer surface of the preforms to provide more uniform heating of the interior so that heating can be accomplished without overheating the outer surface.

Prior art patents that involve heating of blow molding plastic preforms include U.S. Pat. No. 5,256,341 Denis et al. and U.S. Pat. No. 5,681,521 Emmer et al.

DISCLOSURE OF INVENTION

An object of the present invention is to provide an improved heater assembly for heating blow molding plastic preforms in preparation for blow molding of the preforms.

In carrying out the above object, the heater assembly of the invention includes a housing for mounting adjacent a conveyor by which the preforms are conveyed along a path of conveyor from a supply of the preforms to a blow molding machine where the heated preforms are blow molded. A plurality of elongated heaters are mounted by the housing extending along the-path of conveyance in a parallel extending relationship to each other. Each heater includes a pair of mounts for mounting an associated elongated bulb that extends along the length of the heater and has an element that is energized to irradiate the conveyed preforms. Each elongated heater also includes an elongated parabolic reflector that is closely spaced from the associated elongated bulb to reflect radiation thereof to irradiate the conveyed preforms. The element of the associated bulb of each heater is located at the focus of the parabolic reflector such that the parabolic reflector reflects radiation rays in a generally parallel relationship to each other in order to provide controlled heating of the conveyed preforms.

A blow molding plastic preform also includes a window that is located between the heaters and the conveyed preforms. This window is preferably made of quartz and transmits infrared radiation but blocks longer wave radiation so as to provide more uniform heating of the conveyed preforms.

The elongated heaters of the heater assembly are mounted by the housing in a vertically stacked relationship with the parabolic reflectors of the heaters reflecting radiation rays in a horizontal orientation to provide the heating of the conveyed preforms. The heater assembly also includes a lower radiation shield that shields the lower extremity of each conveyed preform from irradiation.

It is also preferably for the heater assembly to include a lowermost heater whose bulb element is spaced closer to the bulb element of the next higher heater than the spacing between the bulb element of the uppermost heater and the bulb element of the next lower heater.

The objects, features and advantages of the present invention are readily apparent from the following detailed description of the best mode for carrying out the invention when taken in connection with the accompanying drawings.

BEST MODE FOR CARRYING OUT THE INVENTION

Figure 1:
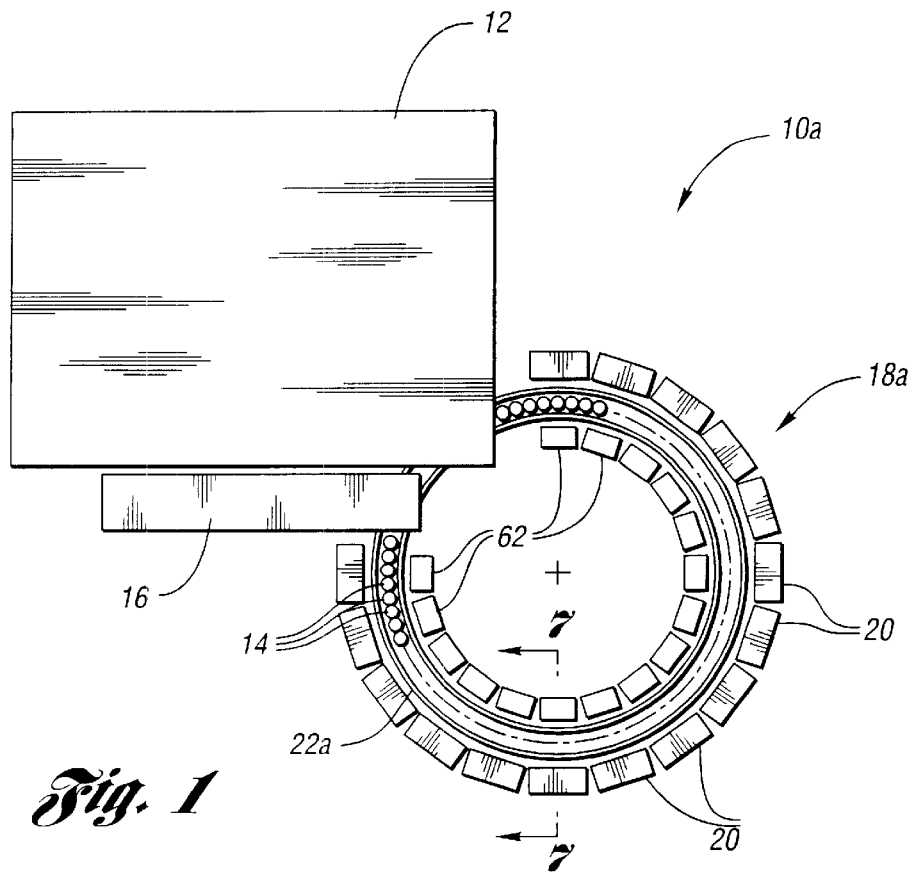
FIG. 1 is a schematic top plan view of a blow molding system that includes a rotary oven including heater assemblies constructed in accordance with the invention for heating plastic preforms in preparation for blow molding thereof as containers.
Figure 2:
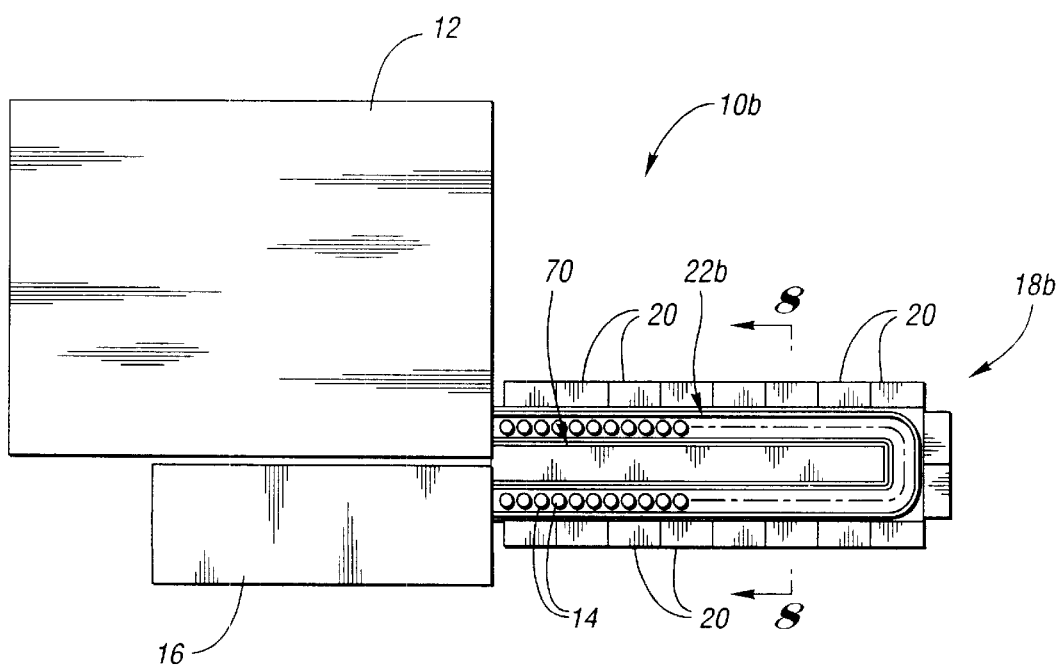
FIG. 2 is a schematic top plan view of another blow molding system that includes a linear oven for heating plastic preforms in preparation for blow molding thereof as containers.

With reference to FIGS. 1 and 2, two plastic blow molding systems identified by 10a and 10b each include a blow molding machine 12 that is supplied plastic preforms 14 from an associated preform supply 16 after heating within an associated oven. As is hereinafter more fully described, the blow molding system 10a of FIG. 1 has a rotary oven 18a that heats the preforms while the blow molding system 10b of FIG. 2 has a linear oven 18b that heats the preforms. Each of the ovens 18a and 18b includes a plurality of heater assemblies 20 that are constructed in accordance with the present invention to provide heating of the preforms as is hereinafter more fully described.

With continuing reference to FIG. 1, the rotary oven 18a of this embodiment has a conveyor 22a that conveys the preforms 14 in a counterclockwise direction from the supply 16 to the blow molding machine 12 past the heater assemblies 20 to provide heating thereof to a sufficient temperature to permit the blow molding in a conventional manner. During such conveyance, the preforms 14 will normally be oriented in an upside down position with a lower open end thereof located downwardly and an upper closed end thereof projecting upwardly. The conveyor 22a will conventionally rotate the preforms 14 about associated vertical axes in order to provide uniformity of the heating.

With further reference to FIG. 2, the linear oven 18b includes a conveyor 22b that conveys the preforms 14 from the supply 16 toward the right and then around a U-turn and then back toward the left. During all of such conveyance, the preforms 14 pass by the adjacent heater assemblies 20 to provide heating thereof prior to delivery to the blow molding machine 12 for the blow molding. This conveyor 22b like the conveyor of the rotary embodiment will also provide rotation of the preforms while in an upside down orientation in order to provide uniformity of the heating.

Figure 5:
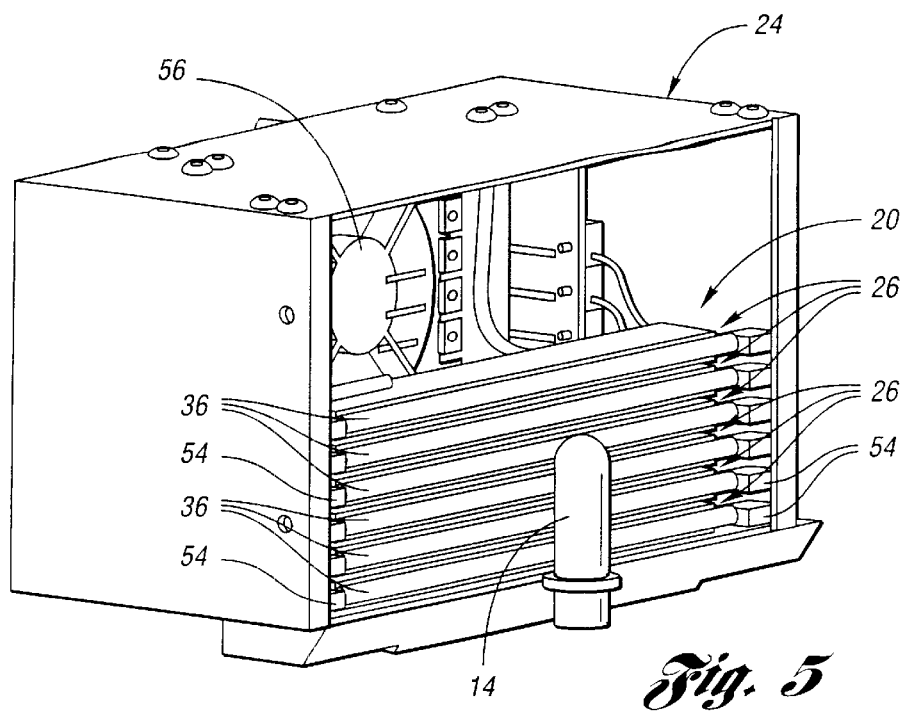
FIG. 5 is a generally front oriented perspective view of the heater assembly to illustrate the elongated construction of the bulbs of each heater.

As illustrated somewhat schematically in FIG. 3, each heater assembly 20 of both embodiments includes a housing 24 for mounting adjacent the associated conveyor by which the preforms 14 are conveyed along a path of conveyance as previously described in connection with FIGS. 1 and 2 from a supply of the preforms to the blow molding machine where the heated preforms are blow molded. A plurality of elongated heaters 26 of each heater assembly are mounted by the housing 24 and, as shown in FIG. 5, extend along the path of conveyance of the preforms 14 in a parallel relationship to each other. The associated conveyor supports the preforms 14 in an upside down orientation with an open dispensing end 30 located in a lower position and with an upper closed end 32 thereof projecting upwardly to adjacent the uppermost heater 26. As previously described, the conveyor will rotate each preform 14 about an associated generally vertical axis A so as to provide uniformity in the heating.

Figure 3:
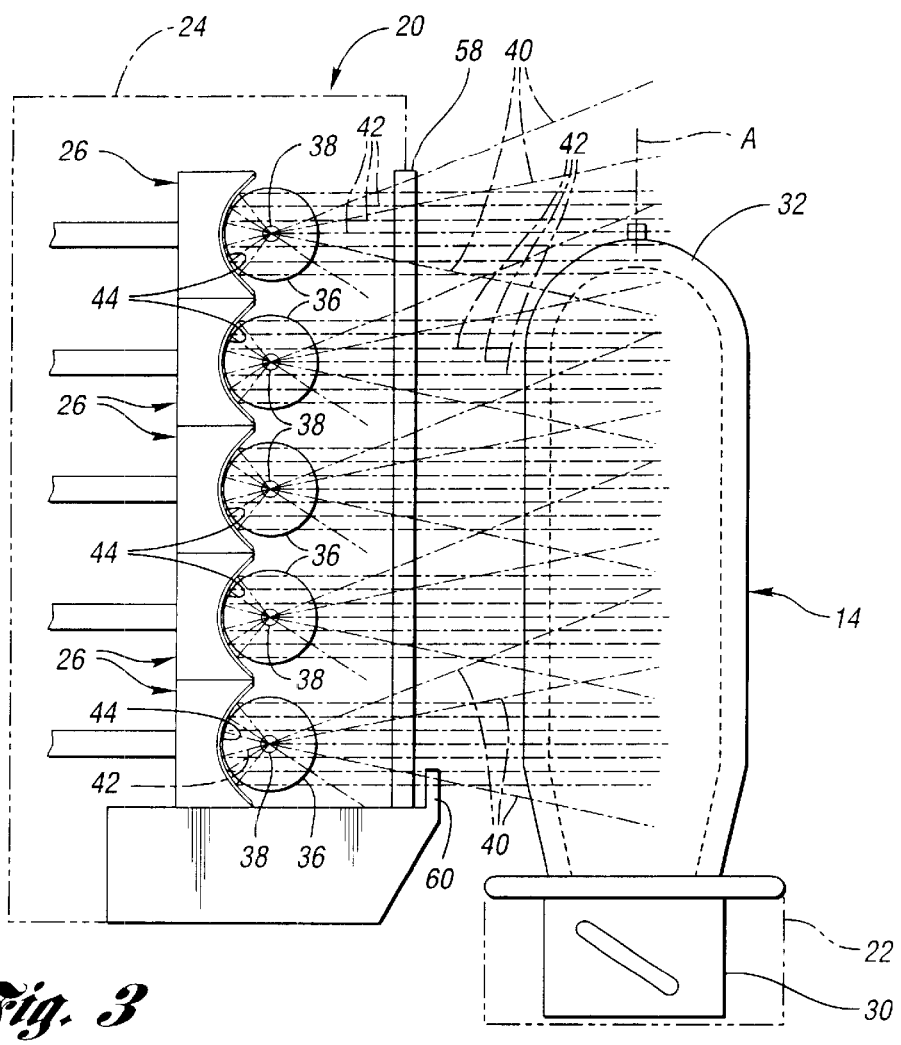
FIG. 3 is a sectional view taken through one of the heater assemblies of either FIGS. 1 or 2 to illustrate its construction as including heaters that include parabolic reflectors for reflecting radiation from associated bulbs to provide uniform heating of the preforms.
Figure 4:
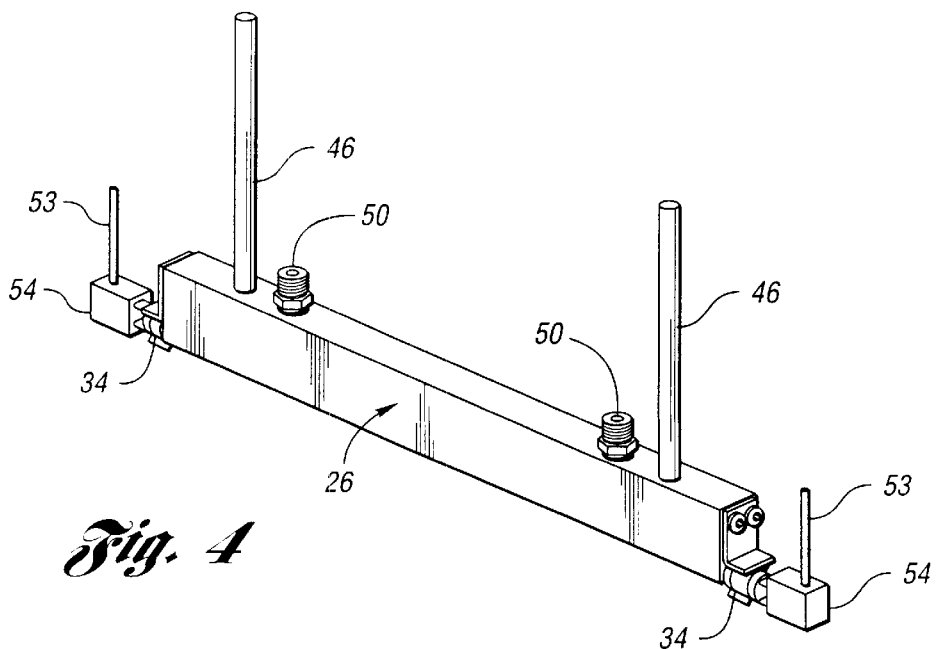
FIG. 4 is a perspective view illustrating the elongated construction of each heater of the heater assembly.

As shown in FIG. 4, each heater 26 includes a pair of clip type mounts 34 for mounting an associated elongated bulb 36 that extends along the length of the heater as shown in FIG. 5 and has an element 38 (FIG. 3) that is energized to irradiate the conveyed preforms 14. Certain of the rays 40 shine directly toward the right as shown in FIG. 3 to provide the irradiation of the preforms 14 while certain other rays 42 shine toward the left. Each elongated heater 26 also includes an elongated parabolic reflector 44 that extends along the length of the heater parallel to the associated bulb 36 in a closely spaced relationship. More specifically, the parabolic reflector 44 as disclosed is made of aluminum and at a horizontal line through the bulb element 38 the parabolic reflector is spaced from the bulb 36 about 0.008 to 0.012 of an inch. The parabolic reflector 44 reflects the radiation of the rays 42 back toward the right to irradiate the conveyed preforms 14 in cooperation with the rays 40 that shine directly toward the right. The element 38 of the bulb 36 of each heater 26 is located at the focus of its parabolic reflector 44 such that the parabolic reflector reflects the radiation rays 42 in a generally parallel relationship to each other in order to provide controlled heating of the conveyed preforms.

Figure 6:
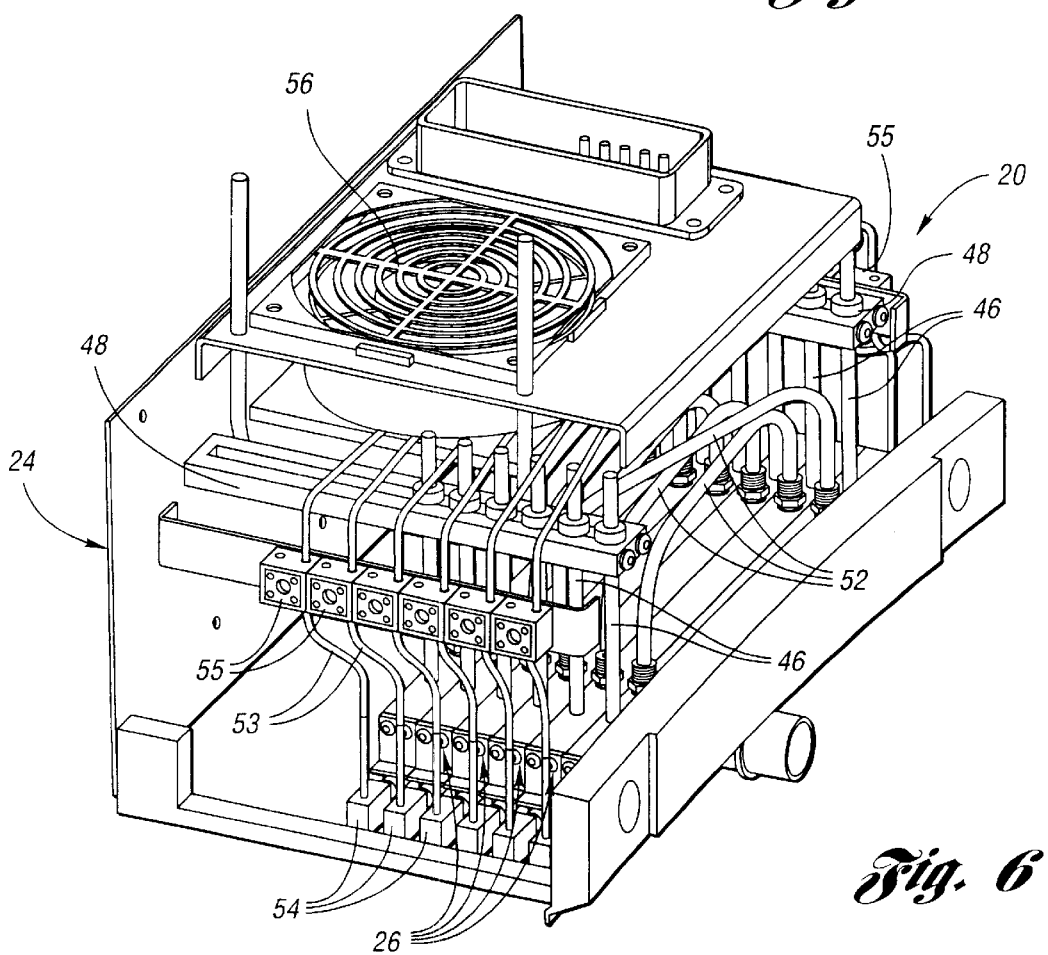
FIG. 6 is a partially broken away back perspective view that further illustrates the construction of the heater assembly as having cooling tubes for each elongated heater.

With combined reference to FIGS. 4 and 6, each heater 26 includes a pair of threaded supports 46 that are suitably secured to mounts 48 supported by the heater assembly housing 24 so as to be closely spaced with each other. Fluid couplings 50 of each heater 26 are connected to cooling tubes 52 through which a cooling fluid flows as to provide cooling of the parabolic reflector 44.

As shown in FIG. 6, electrical wires 53 extend from the bulb ends 54 to electrical connectors 55 to provide the energization thereof that energizes the bulb elements as previously described. Also, a back cooling fan 56 cools the interior of the heater assembly 20 within whose housing 24 the components described above are mounted.

With continuing reference to FIG. 3, the heater assembly 20 also includes a window 58 that is located between the heaters 26 and the conveyed preforms 14. This window 58 is preferably made of quartz or any other material that transmits infrared radiation but blocks longer wave radiation so as to provide more uniform heating of the conveyed preforms. More specifically, the infrared radiation penetrates through the outer surface of each preform so as to provide uniformity in the heating between its outer and inner surfaces as compared to longer wavelengths radiation. Thus the heater assembly 20 provides uniform heating so that the outside surface of the preform does not have to be overheated in order to provide the inside surface with a sufficiently high temperature for the blow molding. The heaters 20 thus allow the use of thicker wall but shorter length preforms of a lighter weight that are more cost effective than heavier preforms.

As shown in FIG. 3, the elongated heaters 26 are mounted by the housing 24 in a vertically stacked relationship with the parabolic reflectors 44 of the heaters reflecting radiation rays 42 in a horizontal orientation to provide heating of the conveyed preforms 14. Furthermore, the heater assembly 20 includes a lower radiation shield 60 that shields the lower extremity of each conveyed preform 30 at its lower end from irradiation. This radiation shield is fabricated from aluminum.

In the preferred construction illustrated, the two lowermost bulbs 36 have their elements 38 spaced closer to each other than the spacing between the bulb elements 38 of the two uppermost bulbs 36 and likewise between the bulb elements 38 of the other bulbs so that there is a greater heating in the lower area where greater deformation takes place. More specifically, the heaters 26 have overall heights of 15, 17 or 19 millimeters. The shorter heaters are mounted at the lower positions to thus space the bulb elements closer to each other and thereby provide greater heating.

Figure 7:
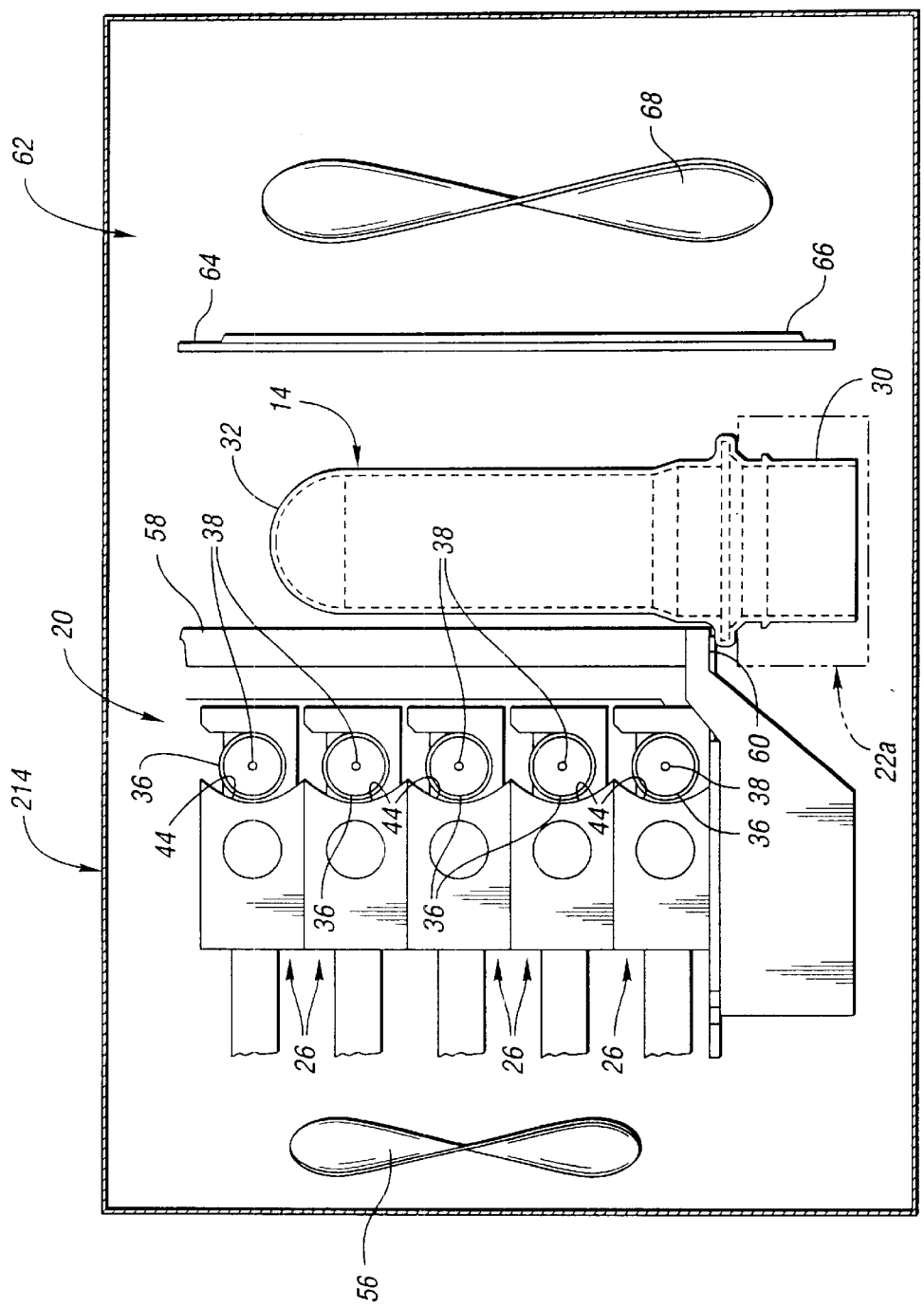
FIG. 7 is a sectional view taken along the direction of line 7—7 of FIG. 1 through the rotary oven to illustrate the construction of the heater assembly in association with the conveyor and a back side reflector and cooling unit.

As schematically illustrated in FIG. 1, each heater assembly 20 of the rotary oven embodiment also cooperates with a back side reflector and cooling unit 62 that is further illustrated in FIG. 7. More specifically, the back side reflector and cooling unit 62 includes a reflector 64 that reflects infrared radiation back toward the performs. The reflector 64 has vertical vent formations 66, and the unit also includes a back fan 68 that provides back cooling of the reflector.

Figure 8:
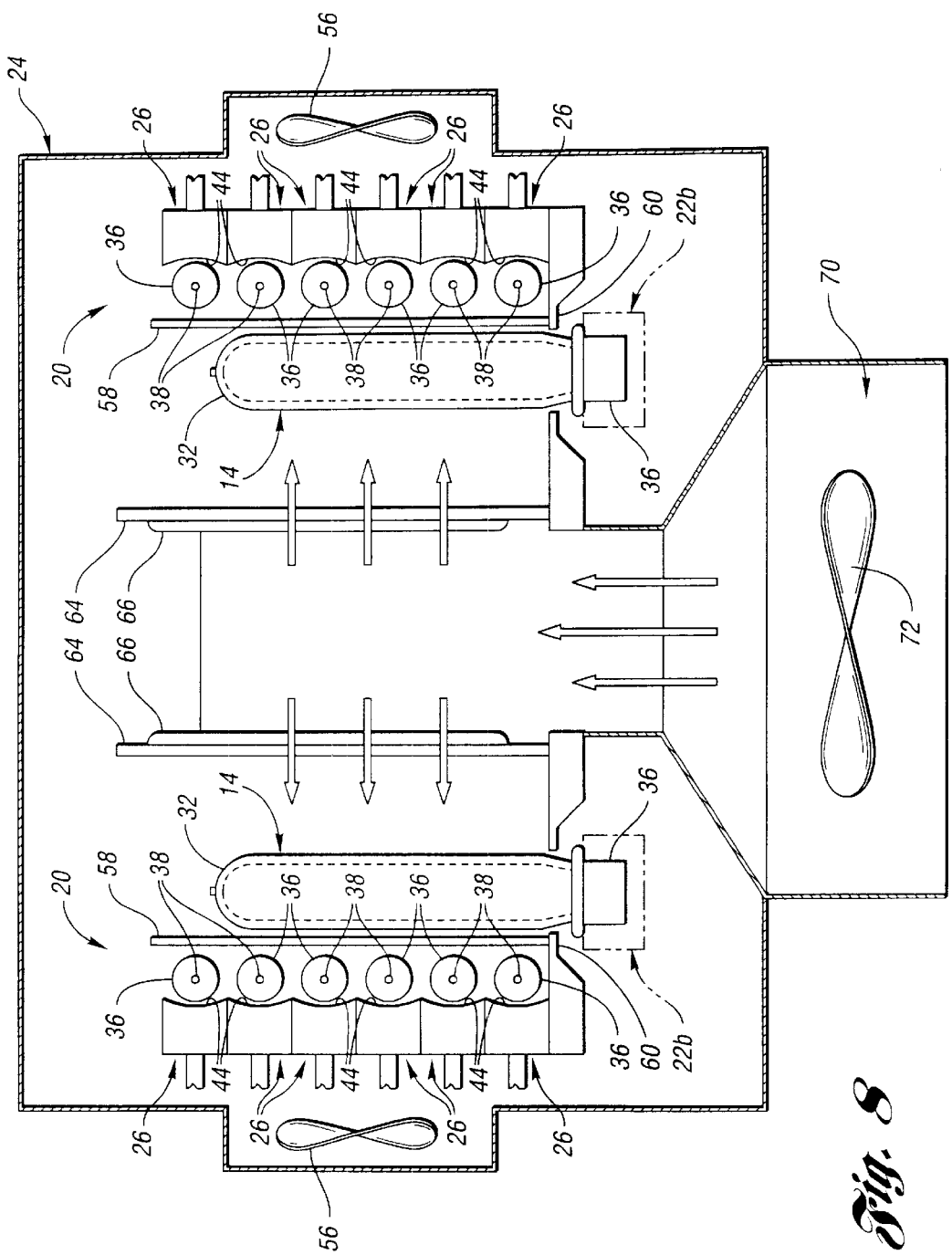
FIG. 8 is a sectional view taken along the direction of line 8—8 in FIG. 2 through the linear oven and illustrates the construction thereof as well as the construction of a back side reflector and cooling unit.

As shown schematically in FIG. 2, each heater assembly 20 of the linear oven embodiment also includes a back side reflector and cooling unit 70. As shown in FIG. 8, the back side reflector and cooling unit 70 has spaced reflectors 64 with vertical vent formations 66 through which a fan 72 provides back side cooling and ventilation.

While the best mode for carrying out the invention has been described in detail, those familiar with the art to which this invention relates will recognize various alternative designs and embodiments for practicing the invention as defined by the following claims.

What is claimed is:

1. A heater assembly for heating blow molding plastic preforms in preparation for blow molding thereof, comprising:

a housing for mounting adjacent a conveyor by which the preforms are conveyed along a path of conveyance from a supply of the preforms to a blow molding machine where heated preforms are blow molded; and a plurality of elongated heaters mounted by the housing extending along the path of conveyance in a parallel extending relationship to each other, each heater including a pair of mounts for mounting an associated elongated bulb that extends along the length of the heater and has an element that is energized to irradiate the conveyed preforms, each elongated heater including an elongated parabolic reflector that is closely spaced from the associated elongated bulb to reflect radiation thereof to irradiate the conveyed preforms, and the element of the associated bulb of each heater being located at the focus of the parabolic reflector such that the parabolic reflector reflects radiation rays in a generally parallel relationship to each other to provide controlled heating of the conveyed preforms.

2. A blow molding plastic preform heater assembly as in claim 1 further including a window that is located between the heaters and the conveyed preforms and transmits infrared radiation but blocks longer wave radiation so as to provided more uniform heating of the conveyed preforms.

3. A blow molding plastic preform heater assembly as in claim 2 wherein the window is made of quartz.

4. A blow molding plastic preform heater assembly as in claim 1 wherein the elongated heaters are mounted by the housing in a vertically stacked relationship with the parabolic reflectors of the heaters reflecting radiation rays in a horizontal orientation provide the heating of the conveyed preforms, and the heater assembly including a lower radiation shield that shields the lower extremity of each conveyed preform from irradiation.

5. A blow molding plastic preform heater assembly as in claim 4 which includes a lowermost heater whose bulb element is spaced closer to the bulb element of the next higher heater than the spacing between the bulb element of the uppermost heater and the bulb element of the next lower heater.

6. A blow molding plastic preform heater assembly as in claim 1 further including a quartz window that is located between the heaters and the conveyed preforms to transmit infrared radiation while blocking longer wave radiation so as to provided more uniform heating of the conveyed preforms, the elongated heaters being mounted by the housing in a vertically stacked relationship with the parabolic reflectors of the heaters reflecting radiation rays in a horizontal orientation to provide the heating of the conveyed preforms, the heater assembly including a lower radiation shield that shields the lower extremity of each conveyed preform from irradiation, and the lowermost heater having its bulb element spaced closer to the bulb element of the next higher heater that the spacing between the bulb element of the uppermost heater and the bulb element of the next lower heater.

7. A heater assembly for heating blow molding plastic preforms in preparation for blow molding thereof, comprising:

a housing for mounting adjacent a conveyor by which the preforms are conveyed along a path of conveyance from a supply of the preforms to a blow molding machine where heated preforms are blow molded;

a plurality of elongated heaters mounted by the housing in a vertically stacked relationship extending along the path of conveyance in a parallel extending relationship to each other, each heater including a pair of mounts for mounting an associated elongated bulb that extends along the length of the heater and has an element that is energized to irradiate the conveyed preforms, each elongated heater including an elongated parabolic reflector that is closely spaced from the associated elongated bulb to reflect radiation thereof to irradiate the conveyed preforms, and the element of the associated bulb of each heater being located at the focus of the parabolic reflector such that the parabolic reflector reflects radiation rays horizontally in a generally parallel relationship to each other to provide controlled heating of the conveyed preforms; and a quartz window that is located between the heaters and the conveyed preforms and transmits infrared radiation but blocks longer wave radiation so as to provided more uniform heating of the conveyed preforms.

* * * * *